United States Patent Office 3,394,139
Patented July 23, 1968

3,394,139
3-HYDROXY-6-OXO-N-PHENETHYLMORPHINAN COMPOUNDS
Yoshiro Sawa, Ashiya-shi, and Shin Maeda, Amagasaki-shi, Japan, assignors to Shionogi & Co., Ltd., Osaka, Japan
No Drawing. Continuation-in-part of application Ser. No. 270,559, Apr. 4, 1963, now Patent No. 3,300,500, dated Jan. 24, 1967. This application Sept. 23, 1966, Ser. No. 581,458
Claims priority, application Japan, Apr. 9, 1962, 37/14,251
4 Claims. (Cl. 260—285)

ABSTRACT OF THE DISCLOSURE

3 - hydroxy - 6 - oxo-N-phenethyl-7-dehydromophinan (cis) and 3 - hydroxy - 6-oxo-N-phenethylmorphinan (cis) [prepared from 3-hydroxy-6-oxo-N-7-dehydromorphinan (cis) and 3 - methoxy-6-oxo-N-phenethylmorphinan (cis) by hydrolytic fission, respectively] and acid addition salts thereof, are useful analgesiis.

---

The present application is a continuation-in-part of co-pending application, Ser. No. 270,559, led Apr. 4, 1963, now U.S. 3,300,500.

The present invention relates a 3-hydroxy-6-oxo-N-phenethylmorphinan compounds. More particularly, it relates to 3 - hydroxy - 6 - oxo-N-phenethyl-7-dehydromorphinan (cis) represented by the formula:

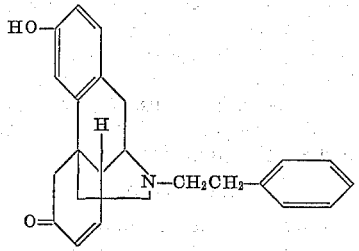

and 3-hydroxy-6-oxo-N-phenethylmorphinan (cis) represented by the formula:

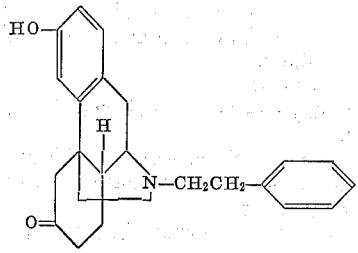

which possess a high analgesic activity. The invention also relates to the use of the said compounds as analgesics.

Accordingly, a basic object of the present invention is to embody 3-hydroxy-6-oxo-N-phenethyl-7-dehydromor- phinan (cis) and 3-hydroxy-6-oxo-N-phenethylmorphinan (cis). Another object of this invention is to embody 3-hydroxy - 6 - oxo-N-phenethyl-7-dehydromorphinan (cis) and 3-hydroxy-6-oxo-N-phenethylmorphinan (cis), each useful as an analgesic agent. These and other objects will be apparent to those conversant with the art to which the present invention pertains from the subsequent description.

The said 3-hydroxy-6-oxo-N-phenethyl-7-dehydromorphinan (cis) and 3-hydroxy-6-oxo-N-phenthylmorphinan (cis) can be prepared by subjecting 3-methoxy-6-oxo-N-phenethyl-7-dehydramorphinan (cis) and 3-methoxy-6-oxo-N-phenethylmorphinan (cis) to hydrolytic fission, respectively.

The starting 3-methoxy-6-oxo-N-phenethyl-7-dehydromorphinan (cis) and 3-methoxy-6-oxo-N-phenthylmorphinan (cis) can be prepared from 2-methoxy-6-oxo-N-methyl-7-dehydromorphinan (cis) and 3-methoxy-6-oxo-N-methylmorphinan (cis) [U.S. Patent 3,085,091] respectively by reacting the same with cyanogen bromide to replace the methyl group at the N-position with a cyano group, treating the resulting N-cyano compound with hydrochloric acid to eliminate the cyano group at the N-position and reacting the resultant N-unsubstituted compound with phenyl bromide.

According to the present invention, the starting 3-methoxy - 6 - oxo-N-phenethyl-7-dehydromorphinan (cis) and 3 - methoxy - 6-oxo-N-phenethylmorphinan (cis) are subjected to hydrolytic fission by a per se conventional procedure which is employed for fission of alkyl phenyl ethers. Some examples of such procedure are as follows: (1) treatment with a mineral acid (e.g. hydrobromic acid, hydroiodic acid) while heating; (2) treatment with a halogenated aluminum compound (e.g. aluminum chloride, aluminum bromide, aluminum iodide) or a halogenated boron compound (e.g. boron fluodide, boron chloride) in the presence or absence of an inert solvent (e.g. benzene, toluene) while heating, followed by treatment with water or an acid; (3) treatment with an acid addition salt of pyridine base (e.g. pyridine hydrochloride, pyridine hydrobromide) while heating; (4) treatment with an alkali (e.g. potassium hydroxide, sodium hydroxide) in an inert solvent (e.g. triethylene glycol, diethylene glycol), preferably in the presence of an antioxidizing agent (e.g. hydrazine), while heating.

The resulting 3-hydroxy-6-oxo-N-phenethyl-7-dehydromorphinan (cis) and 3-hydroxy-6-oxo-N-phenethylmorphinan (cis) form acid addition salts with organic and inorganic acids. Illustrative acid addition salts include the hydrochloride, hydrobromide, hydroiodide, sulfate, phosphate, nitrate, tartrate, salicylate, benzoate, malate, citrate, acetate, etc.

The thus-produced 3-hydroxy-6-oxo-N-phenethyl-7-dehydromorphinan (cis) and 3-hydroxy-6-oxo-N-phenethylmorphinan (cis) and acid addition salts thereof exhibit remarkable analgesic activity. In comparison with a commercially available analgesic agent, levorphan tartrate (3-hydroxy-N-methylmorphinan tartrate), the analgesic activity and toxicity are shown in the following table:

TABLE

| Compound | Analgesic activity | | Toxicity, LD$^{50}$ (mg.-kg.) |
| --- | --- | --- | --- |
| | Haffner-Hesse method | D'Amour-Smith method | |
| Levorphan tartrate | 3.9 | 9.1 | 189.8 |
| 3-hydroxy-6-oxo-N-phenethyl-7-dehydromorphinan (cis) salicylate | 18.0 | 66.0 | 570.2 |
| 3-hydroxy-6-oxo-N-phenethylmorphinan (cis) salicylate | 68.0 | 150.0 | >800.0 |

NOTE.—The analgesic activity was observed by the Haffner-Hesse method [Hesse: Arch. exp. Path. u. Pharm., Vol. 158, p. 233 (1930)] in mice and the D'Amour-Smith method [D'Amour et al.: J. Pharmacol., Vol. 1, p. 255 (1946)] in rats and is shown as the effective ratio to morphine, the value of which is expressed as 1. The toxicity was tested by subcutaneous administration of the test compound to mice.

Thus, 3-hydroxy-6-oxo-N-phenethyl-7-dehydromorphinan (cis) and 3-hydroxy-6-oxo-N-phenethylmorphinan (cis) and acid addition salts thereof are severally useful as analgesic agents.

Presently preferred and practical embodiments of the present invention are illustratively shown by the following examples. The relationship of parts by weight to parts by volume is the same as that between grams and milliliters. Temperatures are set forth in degrees centigrade.

Example 1

To a solution of aluminum bromide (8.4 parts by weight) in anhydrous benzene (84 parts by volume), there is added dropwise a solution of 3-methoxy-6-oxo-N-phenethyl-7-dehydromorphinan (cis) (3.38 parts by weight) in anhydrous benzene (40 parts by volume) with stirring. The resultant mixture is refluxed for half an hour, cooled at 10 C. for 3 hours and decanted to remove the benzene layer. The residue is dissolved in chloroform (300 parts by volume) containing 5% methanol. The chloroform solution is washed with 10% aqueous sodium carbonate (100 parts by volume) twice, dried over anhydrous potassium carbonate and concentrated up to 50 parts by volume. The precipitated crystals are collected by filtration and recrystallized from methanol to give 3-hydroxy-6-oxo-N-phenethyl-7-dehydromorphinan (cis) (1.42 parts by weight) as crystals melting at 183 to 184° C. (decomp.). $[\alpha]_D^{23.5} = -127.7°$ (EtOH, c.=1.012). The salicylate of this substance is recrystallized from methanol to give crystals melting at 217° to 218° C. (decomp.).

Example 2

3-methoxy-6-oxo-N-phenethylmorphinan (cis) (1.58 parts by weight) is dissolved in 48% hydrobromic acid (15 parts by volume), and the resultant mixture is refluxed for 15 minutes. The reaction mixture is concentrated under reduced pressure. The residue is mixed with water, made alkaline with aqueous ammonia and shaken with chloroform. The chloroform layer is washed with water, dried over anhydrous potassium and the chloroform is distilled off to give 3-hydroxy-6-oxo-N-phenethylmorphinan (cis) as an oil. The above substance is crystallized from a mixture of salicyclic acid (0.62 part by weight) and methanol (20 parts by volume) to give 3-hydroxy-6-oxo-N-phenethylmorphinan (cis) salicylate (2.078 parts by weight). This substance is recrystallized from methanol to give crystals melting at 280° C. (decomp.).

The 3-hydroxy-6-oxo-N-phenethyl-7-dehydromorphinan (cis) and 3-hydroxy-6-oxo-N-phenethylmorphinan (cis) and their acid addition salts may be administered alone or in combination with acceptable pharmaceutical carriers, the choice of which is determined by the preferred route of administration, the solubility of the substance and standard pharmaceutical practice. In general, the dosage of these substances is of the one-twentieth to one-third order of magnitude as the dosages of levorphan tartrate (3-hydroxy-N-methylmorphinan), and these substances are useful to treat the types of painful conditions often treated with the said known analgesic agent. Especially, these substances are useful against pains caused by tumor and surgical operations. Examples of pharmaceutical preparations are tablets, capsules, pills, suspension and solution. In the preparation of tablets, for example, these substances may be combined with fillers (e.g. lactose, potato starch, wheat starch) or binders (e.g. gum tragacanth, acacia, cornstarch, gelatin). It is also usually desirable to employ a disintegrating agent such as, for example, cornstarch, potato starch, alginic acid or the like. Also, desirable usually is lubricant such as stearic acid, magnesium stearate or talc along with sweetening agents such as saccharin. Flavoring agents may be also used such as peppermint, oil of wintergreen or cherry flavor. In the preparation of capsules, fillers such as enumerated above for tablets can also be used. These substances when used in the form of suspensions or solutions may be combined with aqueous sugar or sorbitol type vehicle including a viscosity control agent such as magnesium aluminum silicate, methocel or carboxymethylcellulose and a suitable preservative such as sodium benzoate or parabens (methyl and propyl p-hydroxybenzoic acid esters). In these liquid preparations, colorings, flavorings and buffers can also be included to produce a more pharmaceutically elegant preparation.

The compositions containing the 3-hydroxy-6-oxo-N-phenethyl-7-dehydromorphinan (cis), 3-hydroxy-6-oxo-N-phenethylmorphinan (cis) or their acid-addition salts may be dispensed in dosage unit forms for a single daily dose or in smaller units for multiple doses or in larger units for division into single doses. Parenteral compositions can also be dispensed in single units or in larger quantities from which single doses are withdrawn at the time of use.

Example 3

3-hydroxy-6-oxo-N-phenethyl-7-dehydromorphinan (cis) salicylate (50 grams), lactose (6.52 kilograms), cornstarch (3.00 kilograms) and carbomethoxycellulose (210 grams) are mixed together and slugged. The slugs are crushed and passed through a 12 mesh screen. The resulting granules are mixed with talc (200 grams) and magnesium stearate (20 grams) and tableted in the usual way to give 50,000 tablets. Each tablet weighing 200 milligrams contains 1.0 milligram of the active ingredient.

Example 4

3-hydroxy-6-oxo-N-phenethylmorphinan (cis) salicylate (20 grams), lactose (14.00 kilograms) and wheat starch (4.90 kilograms) are mixed and granulated with potato starch paste and dried. The granulate is sieved through a 16 mesh screen and, thereafter, mixed with talc (360 grams) and magnesium stearate (40 grams). The resultant mixture is tableted in the usual way to give 100,000 tablets. Each tablet weighing 200 milligrams contains 0.2 milligram of the active ingredient.

Example 5

3-hydroxy-6-oxo-N-phenethylmorphinan (cis) salicylate (0.75 gram) is dissolved in physiological saline solution to make 10 liters and filtered. The resultant solution is filled into 5,000 ampules under nitrogen atmosphere and the ampules are sterilized at 115° C. for 30 minutes. Each ampule (2 milliliters) contains 0.15 milligram of the active ingredient.

What is claimed is:
1. 3-hydyroxy-6-oxo-N-phenethyl-7-dehydromorphinan (cis).
2. 3-hydroxy-6-oxo-N-phenethylmorphinan (cis).
3. 3-hydroxy-6-oxo-N-phenethyl-7-dehydromorphinan (cis) salicylate.
4. 3-hydroxy-6-oxo-N-phenethylmorphinan (cis) salicylate.

References Cited

UNITED STATES PATENTS

| | | | |
|---|---|---|---|
| 2,974,142 | 3/1961 | Grussner et al. | 260—285 |
| 3,249,616 | 5/1966 | Sawa et al. | 260—285 |
| 3,256,287 | 6/1966 | Sawa et al. | 260—285 |
| 3,257,406 | 6/1966 | Sawa et al. | 260—285 |
| 3,300,500 | 1/1967 | Sawa et al. | 260—285 |

NICHOLAS S. RIZZO, *Primary Examiner.*

D. DAUS, *Assistant Examiner.*